No. 886,593. PATENTED MAY 5, 1908.
F. GARPHEIDE & W. WESTERHEIDE.
BURIAL APPARATUS.
APPLICATION FILED MAY 16, 1907.
2 SHEETS—SHEET 1.
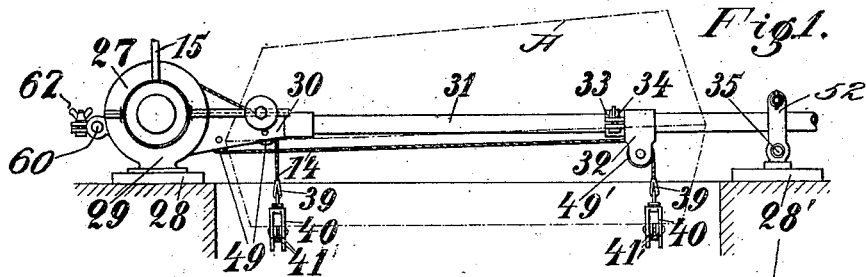
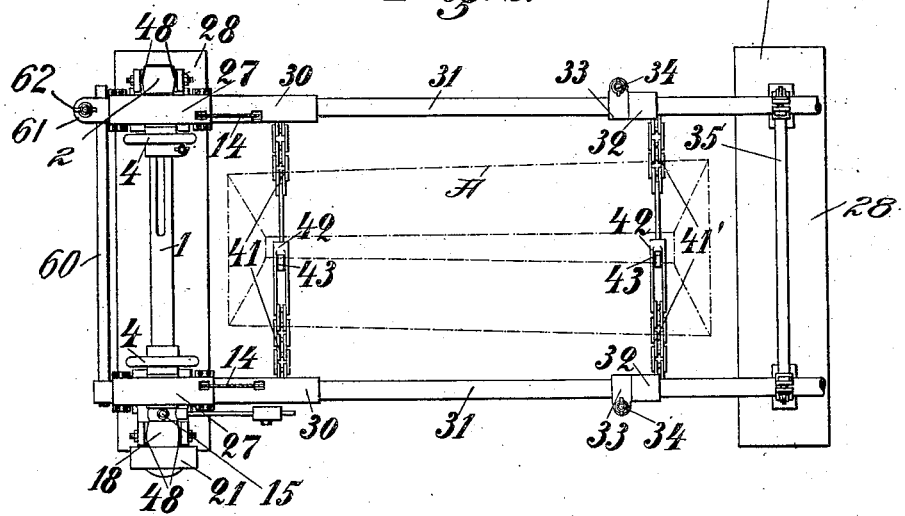
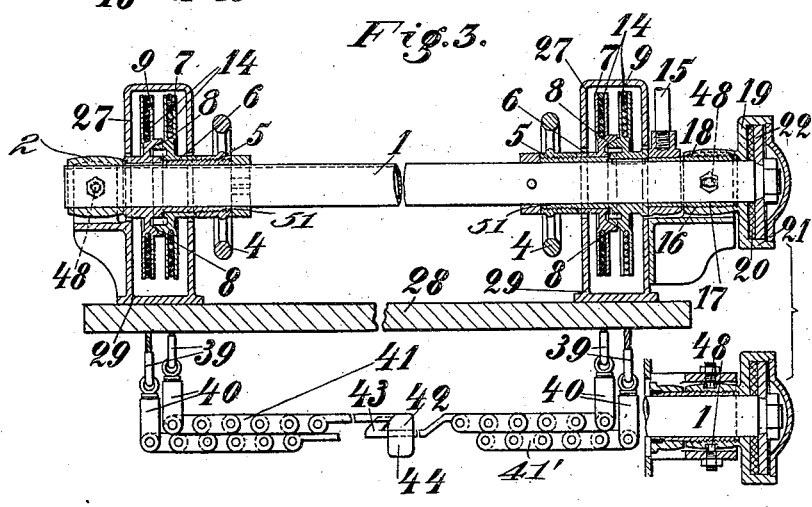

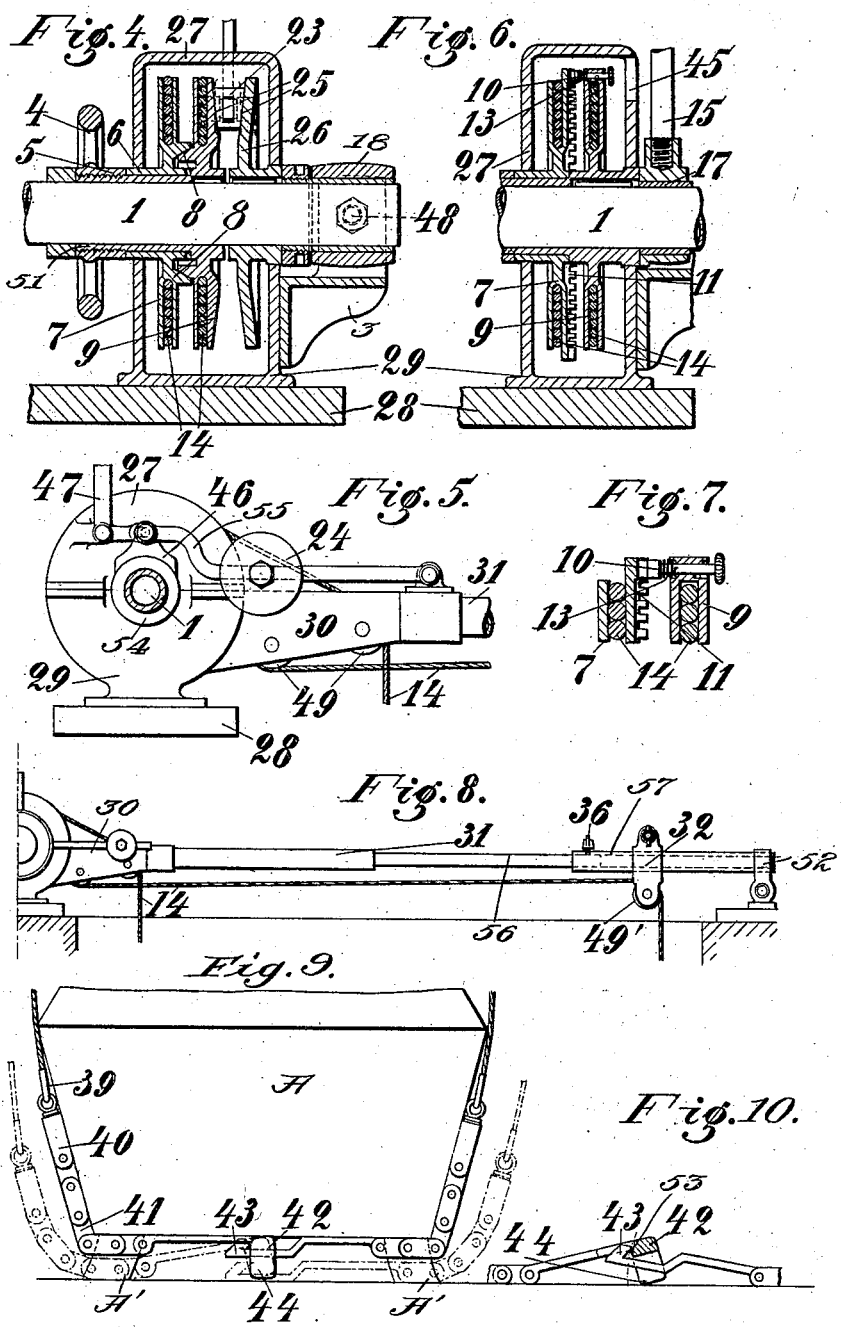

UNITED STATES PATENT OFFICE.

FRITZ GARPHEIDE, OF SOLINGEN, AND WILHELM WESTERHEIDE, OF RATH, NEAR DUSSELDORF, GERMANY.

BURIAL APPARATUS.

No. 886,593.      Specification of Letters Patent.      Patented May 5, 1908.

Application filed May 16, 1907. Serial No. 374,095.

*To all whom it may concern:*

Be it known that we, FRITZ GARPHEIDE and WILHELM WESTERHEIDE, both citizens of Germany, and residents, respectively, of Solingen, Germany, and Rath, near Dusseldorf, Germany, have invented new and useful Improvements in Burial Apparatus, of which the following is a specification.

This invention relates to an improved burial apparatus which is so constructed that it may be readily adapted to caskets of various dimensions, and that the ropes supporting the casket may be automatically uncoupled below the casket after the latter has been lowered into the grave.

In the accompanying drawings: Figure 1 is a side view of our improved burial apparatus; Fig. 2 a plan thereof; Fig. 3 an end view, partly in section, of Fig. 1; Fig. 4 a cross section of a modification of the brake and adjoining parts; Fig. 5 a side view of a further modification of the brake; Fig. 6 a cross section of a modification of the pulley coupling; Fig. 7 a detail section thereof; Fig. 8 a modification of the rods connecting the end frames; Fig. 9 a detail of the chain coupling, showing it closed, and Fig. 10 a similar view showing it open.

The numeral 1, indicates a main shaft adapted to extend along the head or foot of an open grave and rotatable in bearings 2, 18. The latter are pivotally supported by screws 48 in brackets 3 of casings 27, the base plates 29 of which are mounted upon a cross beam 28. Within each casing 27 is fast on shaft 1, a pulley 9 having a tubular hub 51 which is threaded at its outer end. Pulley 9 is integral with the relatively fixed member of a clutch 8, the movable member of which being formed on a pulley 7 having sleeve 6 that loosely embraces hub 51 of pulley 9. The threaded section of hub 51 is engaged by the internally-threaded hub 5 of a hand-wheel 4, so that by rotating hand-wheel 4 in one direction, its hub will bear against sleeve 6, to close coupling 8, while by rotating wheel 4 in the opposite direction, such coupling will be opened.

Casings 27 are provided with brackets 30 to which are secured one end of rods 31 adapted to extend along the sides of the grave, and secured at their other end to standards 52 mounted on a cross beam 28' and connected by a rod 35.

To pulleys 7 are secured ropes 14 which pass over rollers 49 and are connected at their free ends 39 by links 40 to chains 41 adapted to support, say the foot-end of casket A. Likewise, there are secured to pulleys 9, ropes 14 passing over rollers 49 and 49', and connected to chains 41', that are adapted to support, say the head-end of the casket. As the lengths of the caskets vary, means are provided for so spacing chains 41 and 41', that a proper support for both ends of the casket is insured. For this purpose rollers 49' are journaled in sleeves 32 loosely mounted upon rods 31. Sleeves 32 are held in position by split braces 33 adapted to be clamped to rods 31, by screws 34. For adjusting the apparatus to caskets of different lengths, hand-wheels 4 are rotated to disengage pulleys 7 from pulleys 9. Screws 34 are then slackened and sleeves 33 are so shifted on rods 31, that chains 41' are set to the length of the casket. Braces 33 are then brought to bear against sleeves 32 and locked by screws 34. Pulleys 7 are now turned until chains 41' are brought on a common level with chains 41, whereupon hand-wheels 4 are rotated to couple pulleys 7 to pulleys 9.

In order to control the rotation of shaft 1, after a casket has been placed upon chains 41 and 41', the following construction has been devised: Bearing 18 is threaded internally as at 16, to receive the threaded end of a hub 17 which embraces shaft 1 and carries a hand-lever 15. At its outer end bearing 18 is provided with a disk 19 having rim 21. This rim surrounds a friction disk 22 fast on shaft 1. Intermediate disks 19, 22, there is interposed a washer 20 of leather or other suitable material. It will be seen that by turning hand-lever 15 in one direction, disk 19 is pressed against washer 20 and disk 22, to arrest shaft 1, while, when the hand-lever is turned in the opposite direction, shaft 1 is liberated. The free ends of chains 41, as well as those of chains 41', are connected by a lock that automatically opens when the casket touches the bottom of the grave, so that the chains may be readily withdrawn from below the casket. For this purpose the end of one chain is provided with a slotted link 42 having a beveled rear edge 53 and a pair of downwardly extending parallel shanks 44. To the end of the other chain is pivoted a hook 43, the beak of which is adapted to engage the beveled edge 53 of link 42. If the casket is to be lowered, members 42, 43 are coupled, the coupling remaining closed owing to the weight of the casket bearing upon the chains. When the legs A', of casket A, rest on the bottom of the grave, a further playing out of the chains will cause link 42 to assume an inclined position, (Fig. 10), so that hook 43 will drop out of engagement therewith and permit the chains to be raised.

In Fig. 4, the brake is arranged within casing 27, a brake disk 26 being keyed to shaft 1 opposite pulley 9. The opposed sides of disk 26 and pulley 9 are beveled as at 25 to permit the introduction of a conical brake shoe 23.

In Fig. 5, a brake shoe 46 is adapted to be applied to a brake disk 54 fast on shaft 1. Shoe 46 is pivoted to a lever 55 weighted as at 24 and operatively connected to a hand-lever 47.

In Figs. 6 and 7, the coupling 8 is dispensed with and pulley 7 is provided with lateral teeth 11 adapted to be engaged by a pin 10 slidably mounted in pulley 9 and influenced by a spring 13. Pin 10 is accessible through an opening 45 of casing 27.

Fig. 8, illustrates a modification of the rods connecting the front and rear end of the burial apparatus. Here rod 31 is shown to be provided with a reduced end 56 telescoped by a tube 57 which is provided with a clamp screw 36 engaging such reduced end.

We claim:

1. In a burial apparatus, a rotary shaft, means operatively connected thereto for supporting both ends of a casket, a first friction disk secured to the shaft, a second friction disk slidable on the shaft, and a hand lever for bringing said second disk into operative engagement with the first disk, substantially as specified.

2. In a burial apparatus, a rotary shaft, a pair of pulleys mounted thereon, ropes engaging the pulleys, and chains connected to the ropes, combined with a slotted link secured to one of said chains and having a beveled rear edge and a pair of downwardly extending shanks adjoining said edge, and with a hook secured to the other chain and adapted to enter the recess formed between the link-shanks and to engage the beveled edge of the link, substantially as specified.

3. In a burial apparatus, a pair of casings, a shaft journaled therein, pulleys mounted on the shaft, ropes engaging the pulleys, rods secured to the casings, braces adapted to be clamped to the rods, sleeves rotatable and slidable on the rods and engaging the braces, and rollers supported by the sleeves and engaged by the ropes, substantially as specified.

4. In a burial apparatus, a cross-beam, a first casing secured thereto, a bar connected to said casing, a second casing slidable on the cross-beam, means for clamping the second casing to the bar, a shaft journaled in the casings, and means operatively connected thereto for supporting a casket, substantially as specified.

Signed by us at Dusseldorf, Germany, this 20th day of April 1907.

FRITZ GARPHEIDE.
WILH. WESTERHEIDE.

Witnesses:
 ALFRED POHLMEYER,
 M. ENGELS.